No. 648,849. Patented May 1, 1900.
E. J. CHANCE.
WAGON BRAKE.
(Application filed Jan. 6, 1900.)
(No Model.)
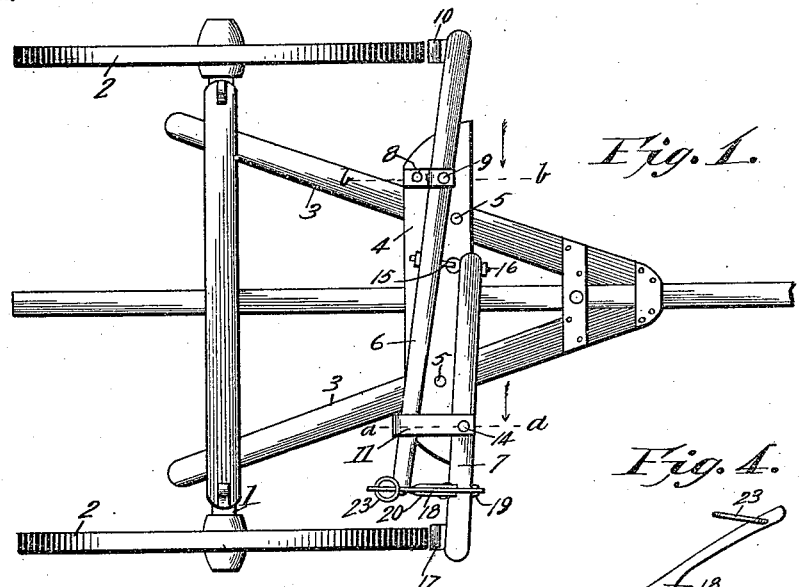
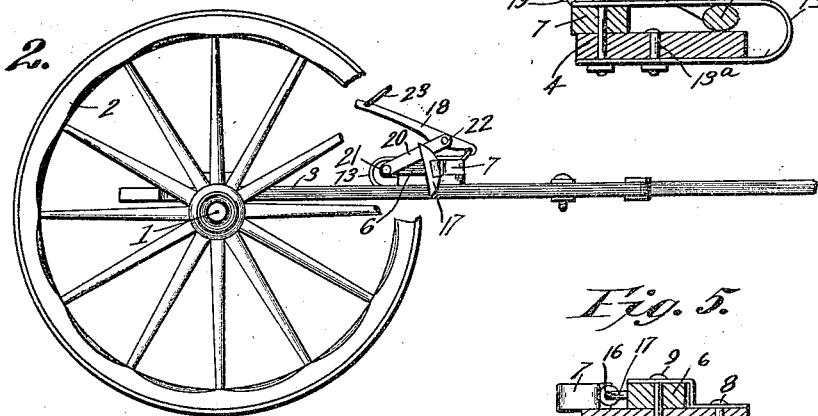
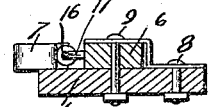
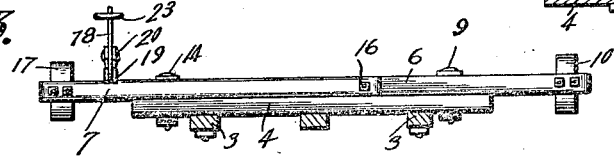
Witnesses  Ephraim J. Chance Inventor
By his Attorneys,

UNITED STATES PATENT OFFICE.

EPHRAIM J. CHANCE, OF CROSS PLAINS, GEORGIA.

WAGON-BRAKE.

SPECIFICATION forming part of Letters Patent No. 648,849, dated May 1, 1900.

Application filed January 6, 1900. Serial No. 639. (No model.)

*To all whom it may concern:*

Be it known that I, EPHRAIM J. CHANCE, a citizen of the United States, residing at Cross Plains, in the county of Carroll and State of Georgia, have invented a new and useful Wagon-Brake, of which the following is a specification.

My invention relates to improvements in brakes for wagons and similar vehicles; and one object I have in view is to provide an improved mechanism adapted to be used on the hounds of a vehicle and in which the parts are arranged and combined to secure increased leverage and force by the brake-shoes against the wheels with a minimum effort on the part of the driver.

A further object that I have in view is to provide an improved brake mechanism in which the brake-levers are held in their true position with relation to the wheels against any tendency to be lifted out of place by the motion of the wheels when the shoes are pressed against the same.

With these ends in view the invention consists in the novel construction and arrangement of parts which will be hereinafter fully described and claimed.

To enable others to understand my invention I have illustrated the same in the accompanying drawings, forming a part of this specification, and in which—

Figure 1 is a plan view of my improved brake applied to a part of an ordinary wagon. Fig. 2 is a side elevation of the devices shown by Fig. 1. Fig. 3 is a transverse section through the hounds and coupling-pole looking in the direction shown by the arrow and illustrating the improved brake in front elevation. Fig. 4 is a vertical sectional view on the plane indicated by the dotted line $a\ a$ of Fig. 1. Fig. 5 is a detail sectional view on the plane indicated by the dotted line $b\ b$ of Fig. 1.

Like numerals of reference denote like and corresponding parts in each of the several figures of the drawings.

In Figs. 1 and 2 of the drawings I have shown so much of a running-gear of an ordinary wagon or analogous vehicle as is necessary to the understanding of my improvements, and in this connection I desire to remark that the numeral 1 designates the rear axle, 2 the wheels thereof, and 3 the hounds which are employed between the usual coupling-pole and the rear axle.

In applying my improved brake to the running-gear of an ordinary vehicle I employ a supporting bar or board 4, which is arranged in a horizontal position on the hounds and coupling-pole and is rigidly secured thereto by suitable devices—as, for example, the bolts 5.

6 indicates the long brake-lever, and 7 the short brake-lever, of my improved brake mechanism. The long brake-lever is fitted on top of the supporting board or bar 4 in a horizontal position, and said long lever 6 is fulcrumed on said board or bar 4 by means of the vertical bolt 9. The bolt constituting the fulcrum for the long brake-lever is reinforced and strengthened by the employment of the cuff or brace-strap 8, which is bent from a single piece or bar of strap metal which is bent into the irregular form shown by Fig. 5 of the drawings. This brace-cuff 8 has one part thereof secured firmly to the supporting bar or board 4, and its other end overlaps the long brake-lever to permit the fulcrum-bolt 9 to pass therethrough, said cuffs 8 serving to hold the brake-lever in position against lifting when the brake-shoe 10 is forced against one of the wheels of the vehicle.

I employ a brace 11 to hold the short brake-lever 7 in proper relation to the supporting bar or board 4 and as a guide for the unconfined end of the long brake-lever 6. This brace and guide 11, which is approximately U-shaped, is bent from a single piece of bar metal, as clearly illustrated in Fig. 4 of the accompanying drawings. The upper portion of the brace and guide 11 extends horizontally from the short lever 7 over the unconfined end of the long lever 6 to a point beyond the supporting bar or board, and the lower side is arranged on the lower face of the supporting-bar and is secured to the same by a bolt 13$^a$ or other suitable fastening device. The outer portion of the brace forms a guide-loop 13 for the long brake-lever 6. The ends of the metal of which the brace is constructed are connected by a fulcrum-bolt 14, which passes through the short brake-lever 6 at a point between the ends thereof. The elongated loop 13 of the brace and guide is arranged to fit loosely around or embrace the free end of the long brake-lever, and the brace and guide is thus arranged in operative relation to both brake-levers to hold the same against any lifting tendency when the brake-shoes are pressed forcibly against the wheels of the vehicle.

The inner end of the short brake-lever 7 is operatively connected with the long brake-lever 6 at a point adjacent to its fulcrum 9, and the preferred means for connecting the two brake-levers together consists of the interlocking eyebolts 15 16, which are fastened, respectively, to the long and short brake-levers, as more clearly shown by Fig. 1.

The means for operating the brake-levers consists of an operating-lever 18, which is fulcrumed at one end by a staple 19 on the short brake-lever 7 at a point within the brake-shoe 17, which is mounted on the free end of said lever 7, and this operating-lever 18 is connected with the inner end of the long brake-lever 6 by means of the link 20. The staple 19, which projects from the short brake-lever, forms a rectangular eye or loop which prevents the operating-lever from turning laterally on it, and the lever 18 is provided at its lower end with an eye to receive the staple 19. I prefer to employ a connecting-link 20, which is forked or bifurcated to embrace the operating-lever 18 at a point adjacent to the fulcrum 19 of said lever 18, and one end of this link 20 is pivoted at 21 to said inner end of the long brake-lever 6, while the other end of the link is adjustably connected by the bolt 22 to the operating-lever 18. The link is thus attached to the operating-lever at a point adjacent to its fulcrum, and the free end of said operating-lever is provided with a loop 23, to which may be connected a cord, cable, or other suitable connection leading to a point within convenient reach of the driver seated on the vehicle.

The described construction and arrangement of the brake-levers insures such adjustment of the parts that the brake-shoes 10 17 of the levers 6 7 are normally free from contact with the wheels of a vehicle. When it is desired to apply force against the vehicle-wheels to retard or arrest the progress of the vehicle, the operator applies power to the lever 18 and moves the levers 6 7 toward each other, thus forcibly impelling the brake-shoes 10 17 against the wheels of the vehicle. When the strain on the operating-lever is released, the parts return to their normal positions.

One of the important and distinguishing features of my improvement is the means for keeping the brake-levers in their true positions with relation to the wheels—that is to say, the levers are prevented from having any lifting tendency by reason of the contact of the brake-shoes with the moving wheels. This is due to the employment of the cuff-brace 8, engaging with the long lever, and to the cuff-brace and guide 11, engaging with the short brake-lever and with the free end of the long brake-lever.

It is evident that changes in the form and proportion of parts may be made by a skilled mechanic without departing from the spirit or sacrificing the advantages of the invention.

Having thus described the invention, what I claim is—

In a vehicle-brake, the combination with a supporting-bar, the long brake-lever fulcrumed between its ends on the supporting-bar at one end thereof and carrying a brake-shoe, the short brake-lever fulcrumed between its ends on the other end of the supporting-bar and provided with a brake-shoe, means for connecting the inner end of the short brake-lever with the long brake-lever, the combined brace and guide disposed transversely of the supporting-bar and extending from the fulcrum of the short brake-lever around the supporting-bar and secured to the lower face thereof, said brace and guide being extended beyond the supporting-bar and receiving the long brake-lever, and an operating-lever fulcrumed on the short brake-lever and connected with the long brake-lever, substantially as described.

In testimony that I claim the foregoing as my own I have hereto affixed my signature in the presence of two witnesses.

EPHRAIM J. CHANCE.

Witnesses:
  W. A. LYLE,
  J. RENO.